United States Patent [19]

Blumhardt

[11] 4,441,655

[45] Apr. 10, 1984

[54] AGRICULTURAL SPRAYING APPARATUS

[75] Inventor: Harold Blumhardt, Ashley, N. Dak.

[73] Assignee: Blumhardt Manufacturing Co., Ashley, N. Dak.

[21] Appl. No.: 241,415

[22] Filed: Mar. 6, 1981

[51] Int. Cl.³ .............................................. B05B 1/20
[52] U.S. Cl. .................................... 239/163; 239/167
[58] Field of Search ............... 239/163, 166, 167, 168, 239/169, 172; 248/654

[56] References Cited

U.S. PATENT DOCUMENTS

| 2,602,684 | 7/1952 | Pinke | 239/168 X |
| 2,619,379 | 11/1952 | Skifte | 239/168 |
| 2,703,222 | 3/1955 | Feucht | 248/654 X |
| 2,770,493 | 11/1956 | Fieber | 239/168 |
| 3,395,503 | 8/1968 | Greenburg et al. | 239/166 X |
| 3,866,834 | 2/1975 | Shannon | 239/167 |

FOREIGN PATENT DOCUMENTS 587484 4/1947 United Kingdom ................ 239/166

Primary Examiner—John J. Love
Assistant Examiner—Mary F. McCarthy
Attorney, Agent, or Firm—Merchant, Gould, Smith, Edell, Welter & Schmidt

[57] ABSTRACT

Sprayer apparatus for agricultural applications is disclosed. The sprayer apparatus disclosed includes spring-biased, damped booms having an inner portion with a parallelogram form. The individual booms have two points of articulation and they are spring-biased to a center position to permit breakaway. A linkage is provided which tends to list the outer section of each boom during breakaway.

14 Claims, 16 Drawing Figures

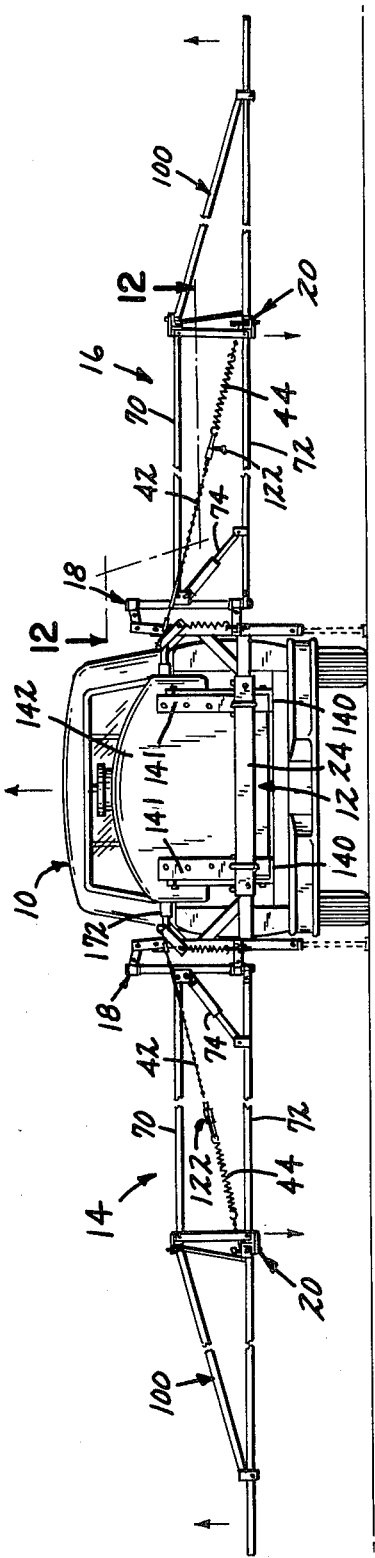
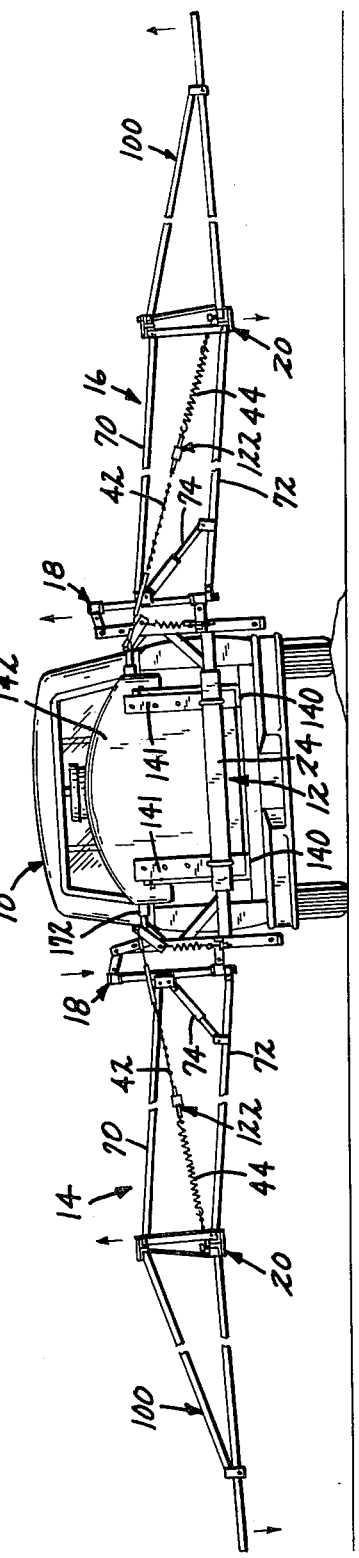

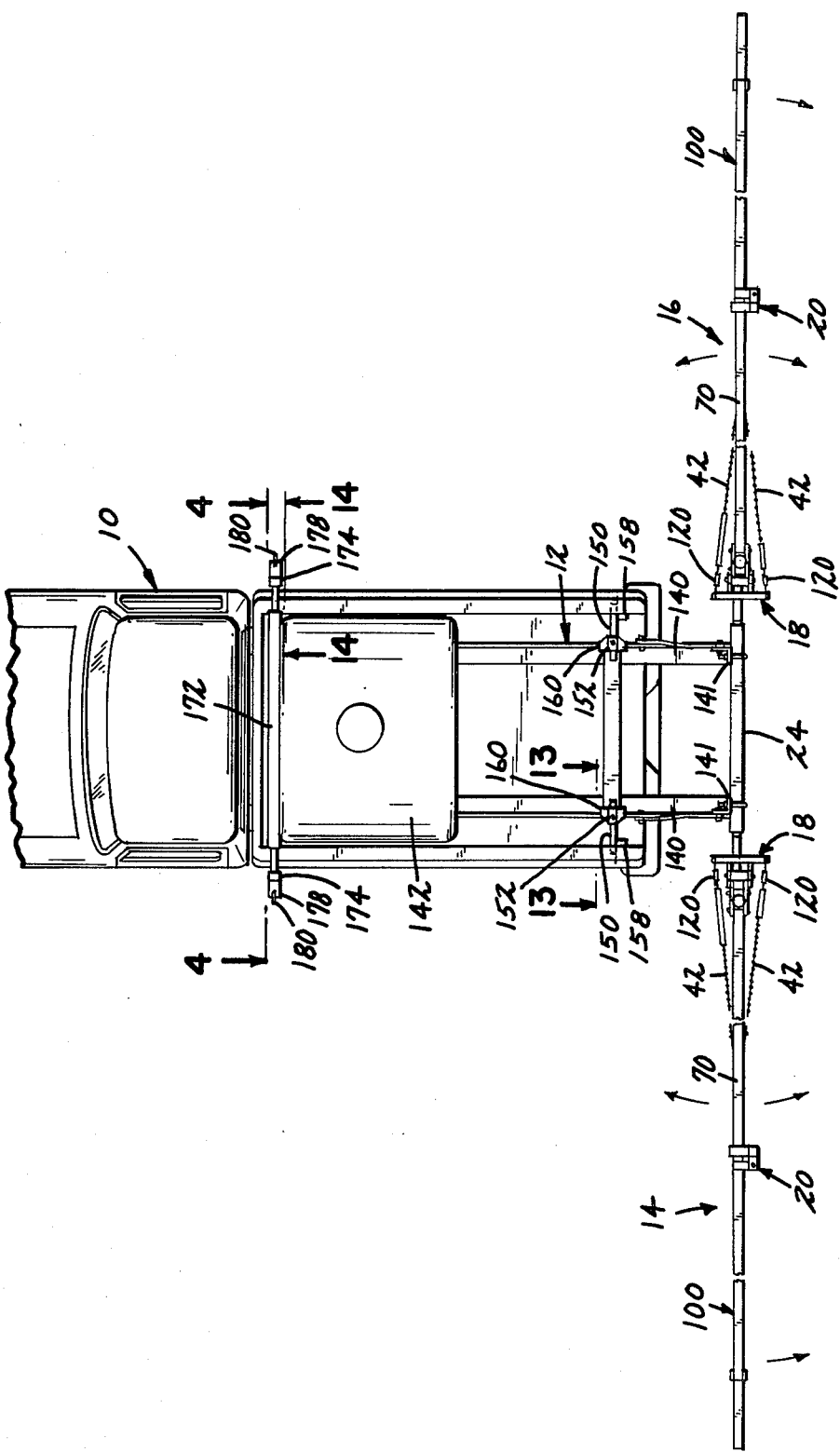

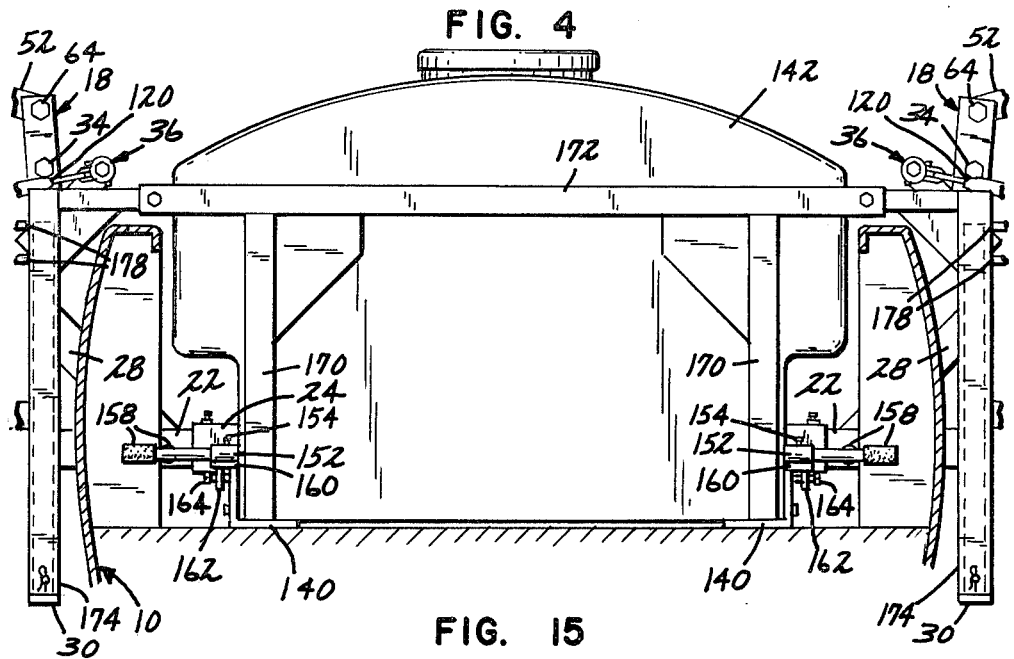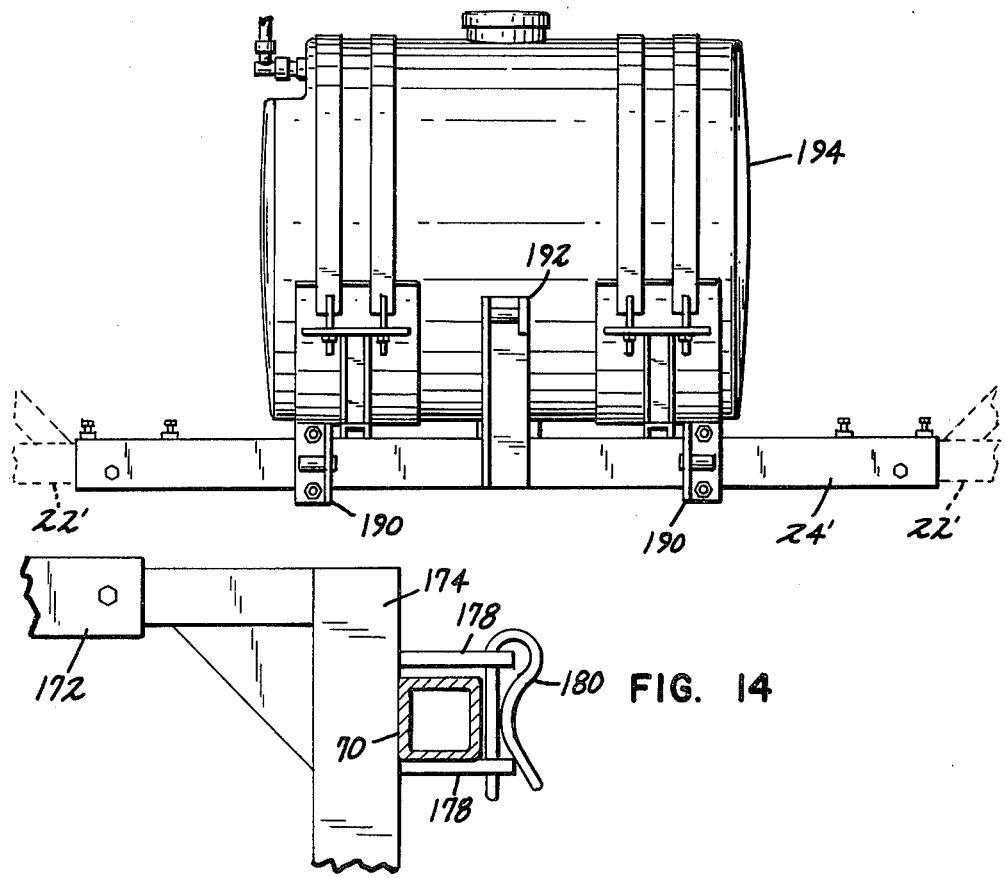

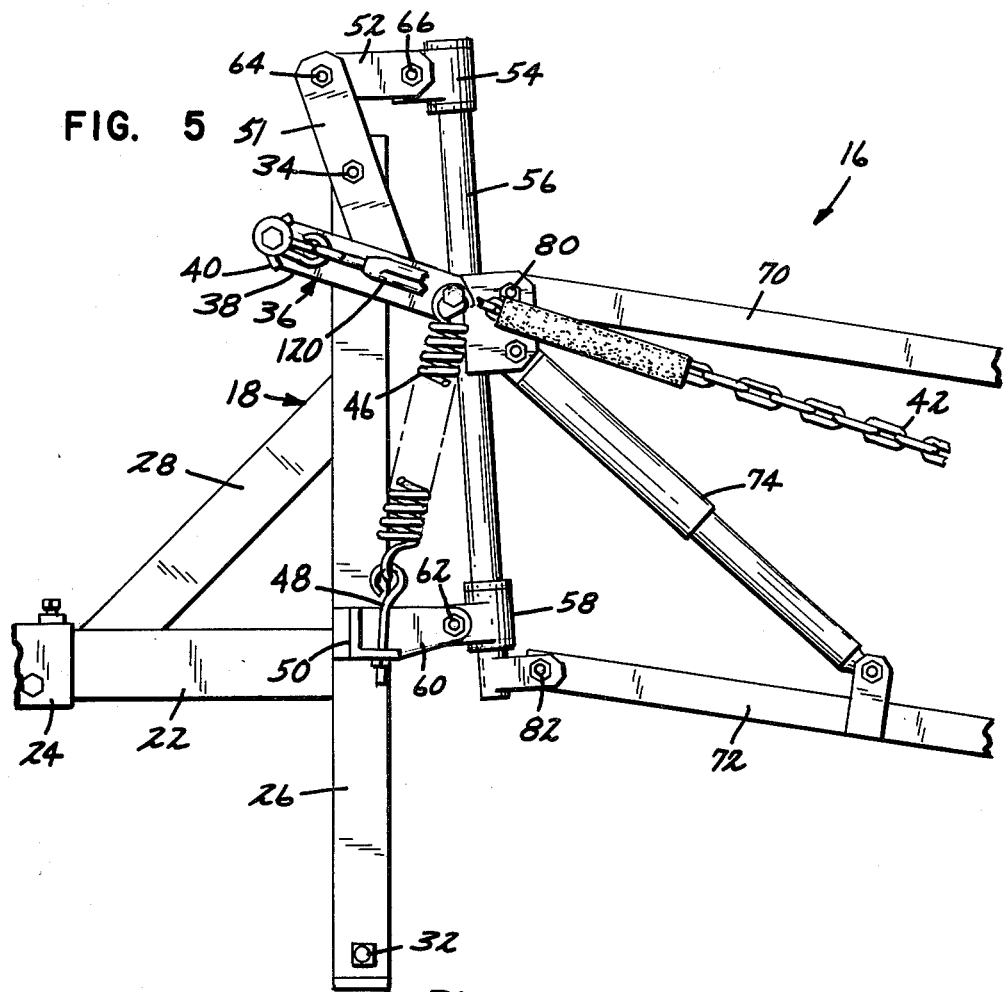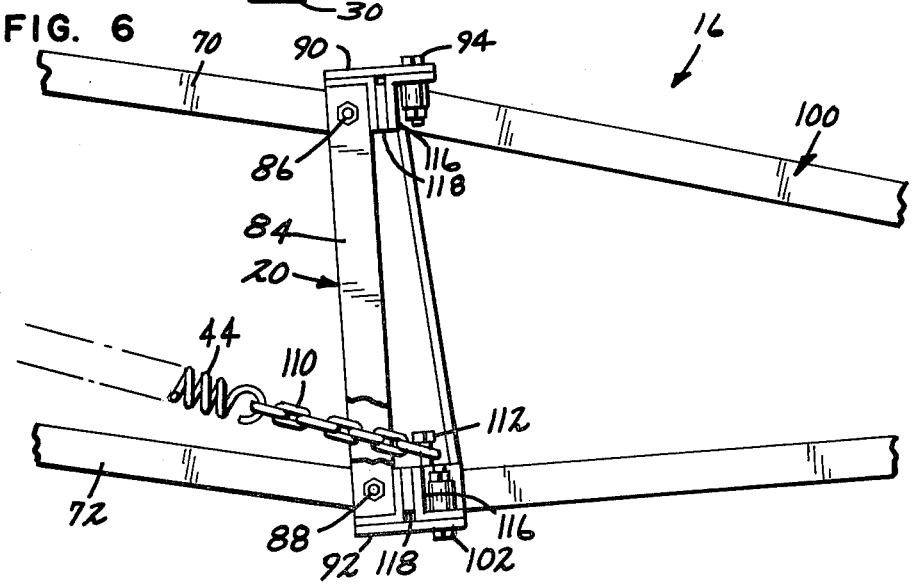

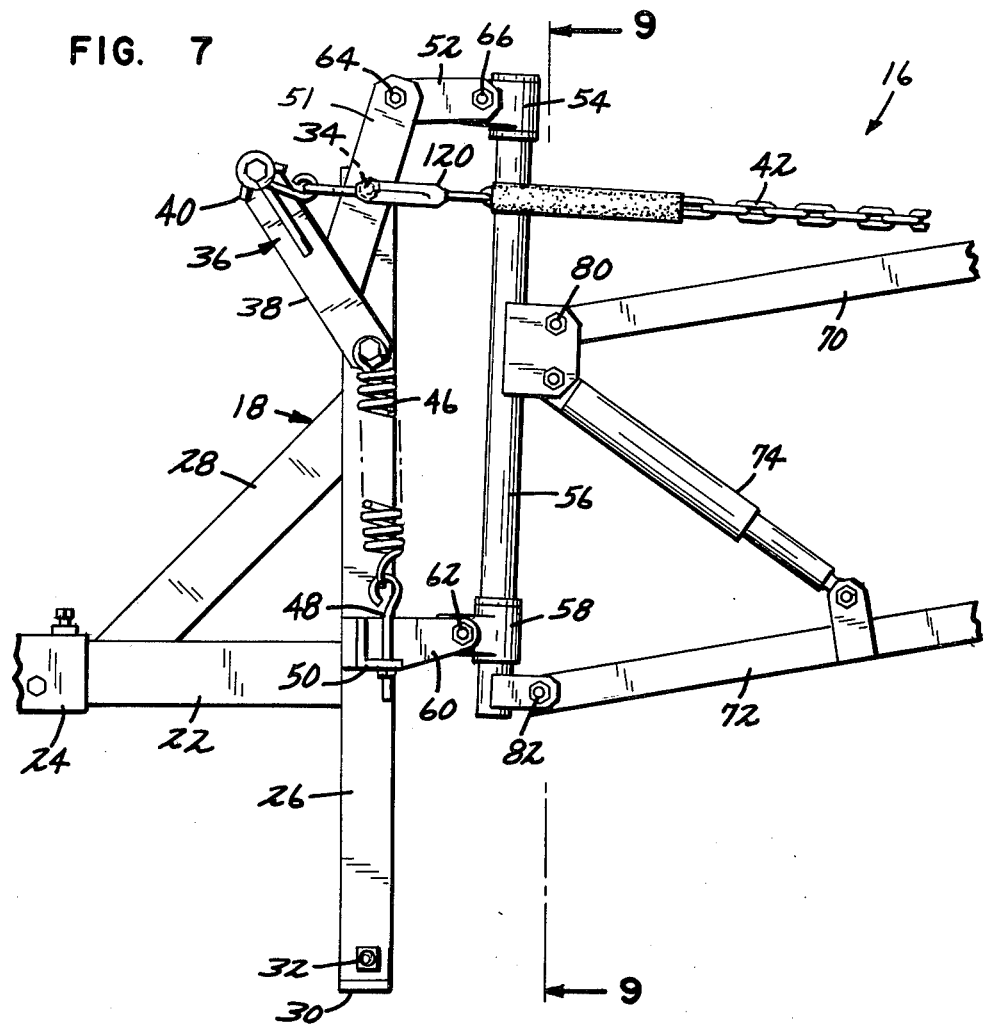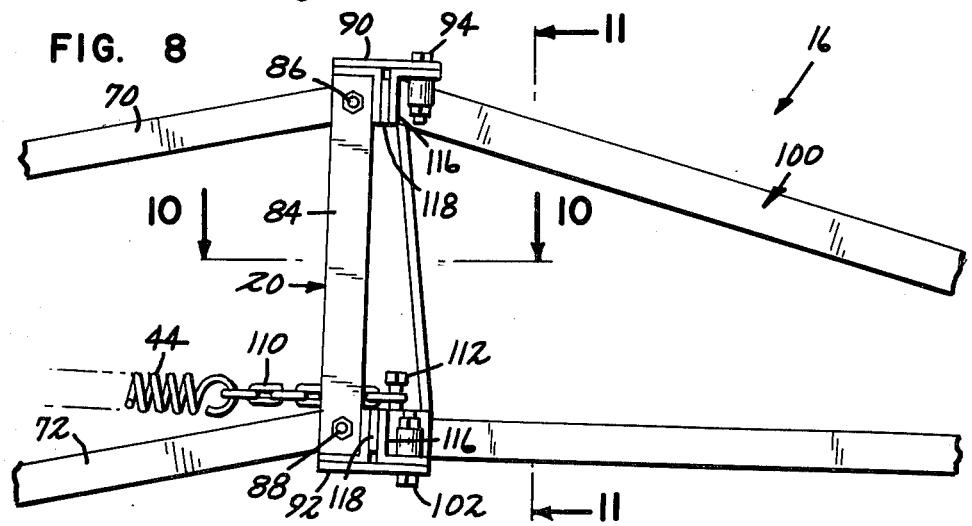

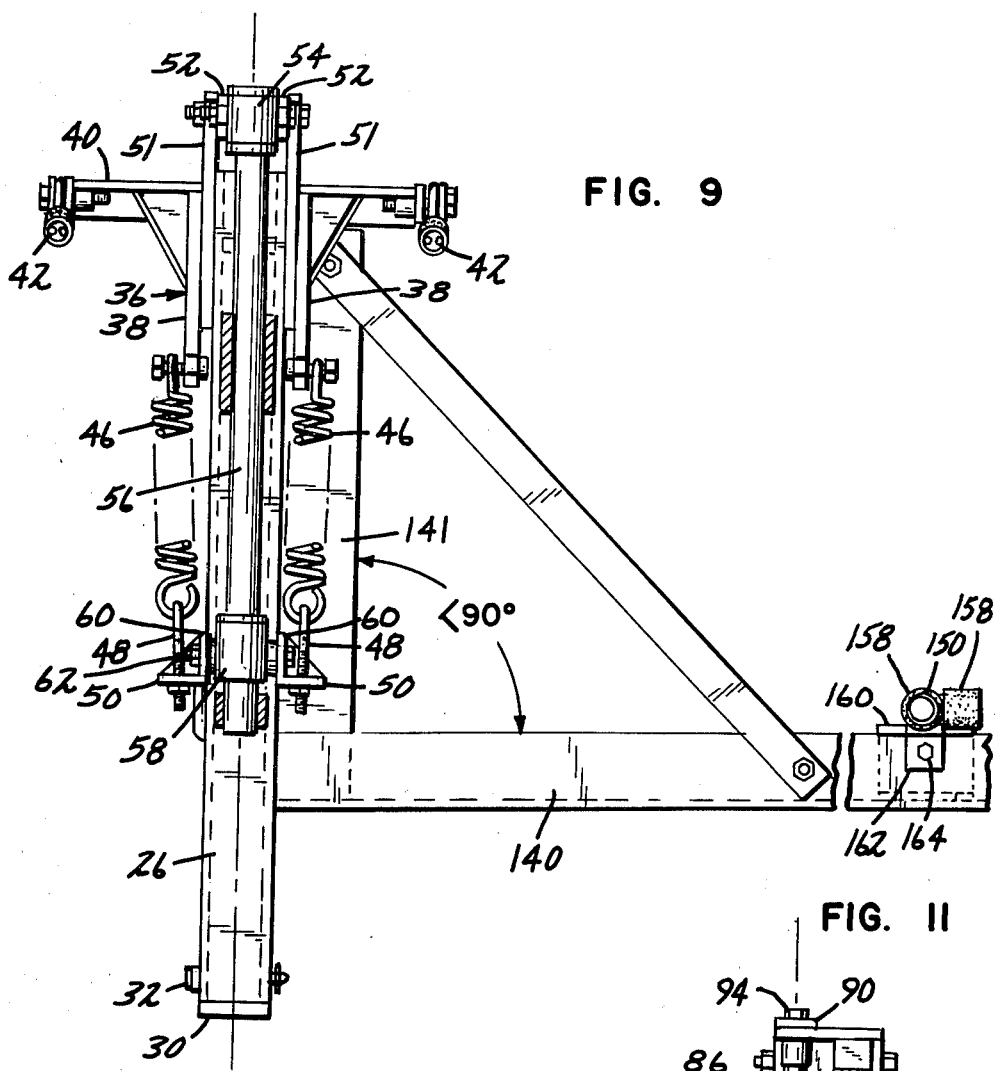
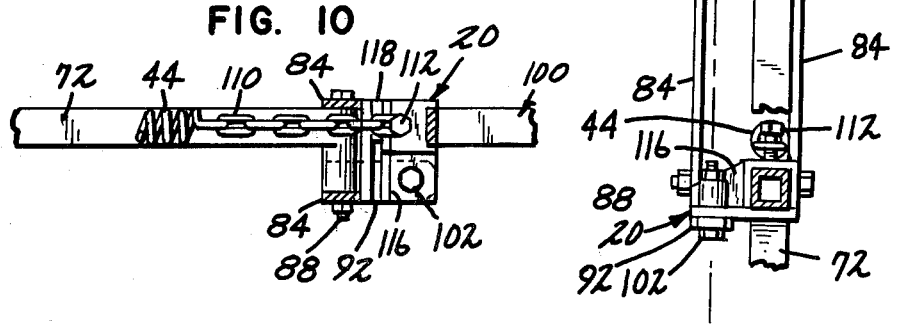

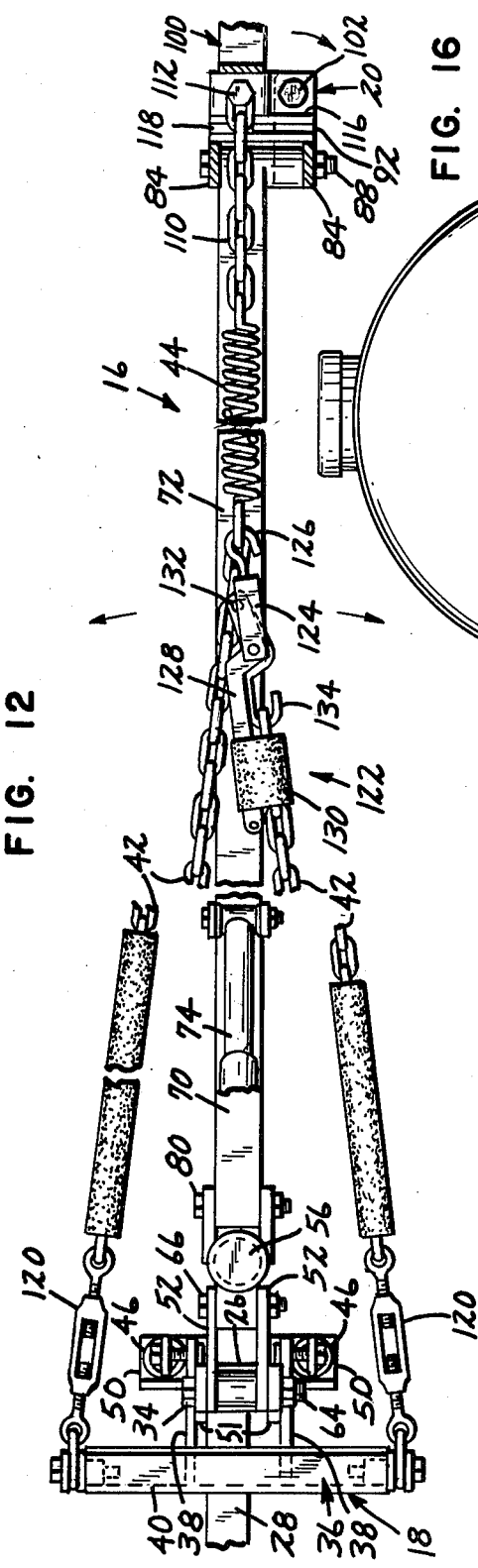
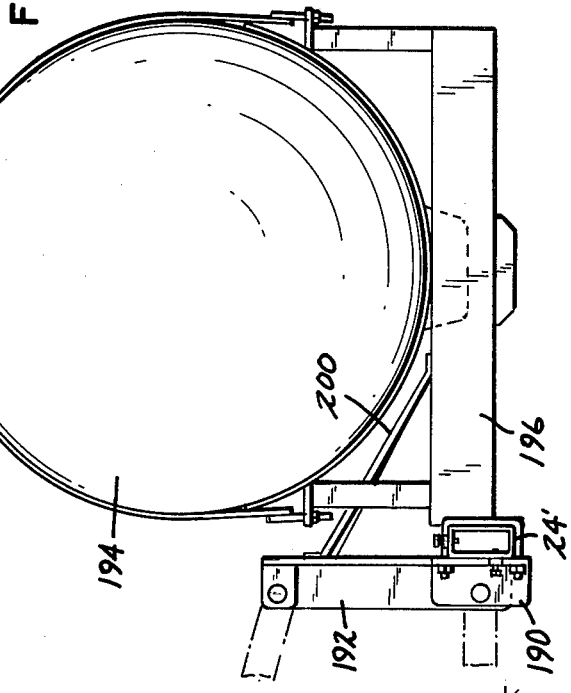
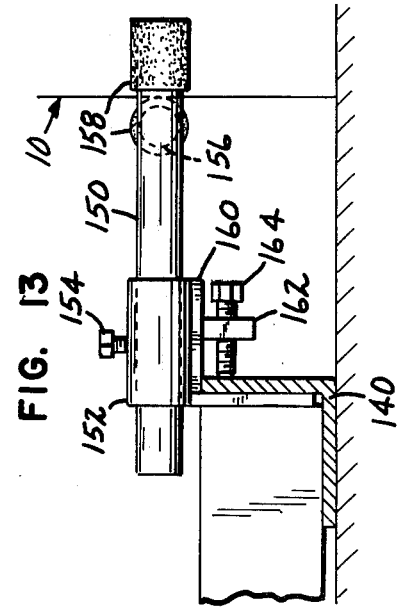
FIG. 12
FIG. 16
FIG. 13

AGRICULTURAL SPRAYING APPARATUS

BACKGROUND OF THE INVENTION

This invention generally relates to agricultural implements, and particularly concerns a structure and suspension system usable in connection with sprayers and other cantilevered boom structures which extend outward from a vehicle in use, and which are moved over a relatively uneven surface during use.

One of principal applications envisioned for the present invention is the provision of spraying equipment which is readily mounted to a vehicle such as a pickup truck, and which is moveable across an agricultural field to spray herbicide or fertilizer. Spraying equipment of this type typically has a pair of booms, each of which extends laterally outward from the drive vehicle. Each of these booms is typically cantilevered from the drive vehicle. As might be expected, a primary goal of a spraying system is to cover as much area in a single swath as possible. When this is done with a system having a pair of cantilevered booms which hold spray heads spaced along each of the booms, this means each of the cantilevered booms must be as long as possible consistent with proper handling of the vehicle, safety constraints, and the ability of the vehicle to move the booms smoothly across an uneven surface without causing undue movement above the surface.

Individual spraying heads typically have a cone-shaped downwardly directed spray. With a number of such spray heads spaced across a sprayer boom at distances such that an even spray without crossover or gaps will normally result, it is essential that the boom typically be maintained at a fairly constant height above the surface to be sprayed. It will be apparent that if the boom is suddenly too low, gaps or unsprayed strips will appear. If the boom is too high, the coneshaped nature of the spray will cause crossover or double spraying in some areas, yet too light a coverage in other areas.

Another constraint faced by a person designing a sprayer is that of protecting the booms against possible impacts. These impacts can occur because the booms are moving forward across a ground surface and inadvertently strike an obstruction, pole, fence post, or other stationary object. These problems can also occur when the mounting vehicle for the sprayer travels over irregularities in the ground surface. Such irregularities can cause the vehicle to tilt with respect to the general plane of the ground surface. Absent some correction system such movement may result in contact of one or both of the booms with the ground surface itself, either causing damage to the boom or sprayer structure or interfering with the crop or soil to be treated.

The invention described in this application is the result of development of a unique structure which provides compensation for uneveness in a ground surface. In addition, due to the construction of the present invention, protection against contact with obstructions encountered by sprayer booms as they move across a field surface is also provided. In addition, the individual booms of the inventive sprayer structure are foldable to be stored in use. While the sprayer of the present invention would function well if mounted on a pickuptruck, it is not limited to such mounting. As shown and described, it may also be mounted by means of a three-point hitch structure to other agricultural vehicles, and is no sense limited to any particular vehicle.

SUMMARY OF THE INVENTION

The invention includes a damped, spring-biased linkage system. The spring bias in the system functions to cause the linkage to compensate for sudden vehicle movements to maintain the sprayer booms connected to the linkage in a generally parallel orientation relative to the surface being sprayed. In addition, in some embodiments, the invention includes a horizontal breakaway feature. This is accomplished by means of a y-shaped centering suspension which normally holds the spray booms in an orientation transverse to a direction of travel of the vehicle to which they are mounted. Each individual boom is hinged or journaled and allowed to break away from that normal position upon contact. The boom then gradually returns to its normal position under the influence of the spring bias upon removal of the obstruction. Because of the way in which the suspension is constructed, the boom tends to move upwardly during the breakaway movement. This facilitates eventual movement of the boom up and over an obstruction or free of a ground surface if ground surface contact has occured.

In some embodiments, the sprayer apparatus of the present invention is provided with means to readily mount the sprayer in a pickuptruck. Also, in some embodiments it is provided with means for readily folding individual booms to a compact position against a pickuptruck or other carrying vehicle for storage when the spraying system is not in use.

Various other advantages and features of novelty which characterize this invention are pointed out with particularity in the claims forming a part of this application. However, for a better understanding of the invention, its advantages, and objects obtained by its use, the reader is referred to the drawings which form a part of this application and accompaning descriptive matter in which a preferred embodiment of the present invention is illustrated and described.

BRIEF DESCRIPTION OF THE DRAWINGS

In the drawings, in which like reference numerals throughout the several views denote like elements:

FIG. 1 is an elevational fragmentary view of sprayer apparatus constructed according to one embodiment of the present invention, in which the sprayer apparatus is mounted at the rear of the conventional pickup-truck;

FIG. 2 is an elevational view similar to FIG. 1 illustrating the movement of the structure of FIG. 1 in response to movement of the pickup-truck over an uneven ground surface;

FIG. 3 is a top plan view of the invention of FIG. 1 for the purpose of illustration of the break-away feature and a storage capability of the present invention;

FIG. 4 is a fragmentary partially sectional view of the structure of FIG. 3, taken generally along the line 4—4 of FIG. 3, particularly illustrating certain structure for mounting the present invention in the box of a conventional pickup-truck;

FIG. 5 is a fragmentary, elevational view of one of the portions of the invention as shown in FIGS. 1 and 2, showing particularly a shoulder portion of the boom supporting structure;

FIG. 6 is a fragmentary elevational view showing another portion of the invention, showing particularly an elbow portion of the boom supporting structure;

FIG. 7 is a view similar in nature to FIG. 5 showing the shoulder portion of one embodiment of the invention in a different orientation than the view of FIG. 5;

FIG. 8 is a view similar to FIG. 6, showing a different orientation for the elbow portion of one embodiment of the invention;

FIG. 9 is a fragmentary sectional elevational view taken generally along the line 9—9 of FIG. 7.

FIG. 10 is a fragmentary sectional view taken generally along the line 10—10 of FIG. 8;

FIG. 11 is a fragmentary, sectional side elevational view of the structure of FIG. 8 taken generally along the line 11—11 of FIG. 8;

FIG. 12 is a fragmentary top plan view of a portion of the support structure of the present invention, portions broken away to show key features and to reduce the size of the drawing;

FIG. 13 is a sectional view taken along line 13—13 of FIG. 3, taken particularly to show the details of a mechanism for mounting the agricultural spraying apparatus of the present invention in the box of a pickup-truck;

FIG. 14 is a fragmentary sectional view as seen from line 14—14 of FIG. 3;

FIG. 15 is an elevational view of an adaptation of the present invention to be mounted on vehicles utilizing three-point hitches for agricultural applications;

FIG. 16 is an elevational view taken right-to-left of the structure of FIG. 15.

Preferred embodiments of the invention will now be described in connection with the figures identified above. While these figures and the accompanying description illustrate a preferred form of the present invention, they are not intended in any way to limit or circumscribe the scope of the invention. It will be apparent to persons of skill in the art that a number of modifications and changes might be made to the invention as defined by its claims without departing in any way from the spirit and intent of the invention. The descriptive material that follows is intended for the purpose of further explaining and facilitating use of the invention, and is in no way intended to be read as limiting the invention to the precise structure as shown in the drawings and accompanying description.

DESCRIPTION OF THE PREFERRED EMBODIMENT

Referring to the drawings, wherein like reference numerals throughout the several views denote like elements, there is shown a mounting and transport vehicle 10, which in the typical application of this invention will probably be a conventional pickup-truck. Truck 10 carries a central support structure generally designated 12 into which a pair of cantilevered agricultural sprayer boom structures generally designated 14 and 16 are received. Since individual sprayer booms 14 and 16 are essentially mirror images about the axis of the vehicle to which they are mounted, only one of these booms will be described in detail in the application, except with respect to movements individual booms on each side of the vehicle make in response to a particular vehicle motion. (For example, in discussion of the motion as shown in FIGS. 1 and 2)

Each sprayer boom contains a section which will generally be referred to as a shoulder section 18. This is described as a shoulder section because it allows movement of its associated sprayer boom in a number of directions with respect to its drive vehicle to facilitate storage, breakaway protection, and compensation for various vehicle movements. In addition, each sprayer boom includes an elbow portion generally designated 20. Elbow portions 20 also permit articulation of the portion of the sprayer boom outward from such portions for purposes of compensation for vehicle movement, storage and impact protection. Details of the shoulder sections 18 are particularly shown in connection with FIGS. 5 and 7, while details of the elbow portions are particularly shown in connection with FIGS. 6 and 8.

For clarity and better understanding of the invention described and claimed in this application, details of individual sprayer heads and sprayer lines carried by sprayer booms 14 and 16 are not shown. The invention described and claimed in this application is believed to lie in the support and linkage structures for the sprayer apparatus, rather than individual sprayer heads and lines themselves.

As shown particularly in FIG. 5, each sprayer boom is received in central support structure 12 by means of a telescoping mounting of an extension bar 22 into a female tube member 24. Extension bar 22 may then suitably be secured by bolts extending through tube member 24 as shown. While this telescoping mounting provides for ease of removal of individual sprayer booms from central support structure 12, it will be understood that a number of other mounting procedures and structures could be used in connection with this invention.

Fastened to extension bar 22 by welding or other means is a central vertical boom support 26. An angle brace 28 provides additional support between extension bar 22 and vertical support 26. Vertical support 26 may be hollow and carry extension feet 30 which telescope downward to support the boom and central support structure independent of truck 10 or other vehicles for storage. As shown in FIG. 5, a fastener or set screw 32 may maintain a particular extended position of telescoping feet 30. Vertical supports 26 provide the main rigid attachment of sprayer booms 14 and 16 to truck 10.

Shoulder section 18, as shown in FIG. 5, includes a first linkage defined by four pivot points. The first of these is an upper pivot 34, which may be a stud or other extension from vertical support 26 on both sides of vertical support 26 to carry a U-shaped spring connector 36. U-shaped spring connector 36 includes a pair of arms 38—38, each of which is fastened to a horizontal bar 40. Fastened at opposite ends of bar 40 are a pair of chains 42. Chains 42 converge to and are fastened to an extension spring 44 as shown in FIG. 12. Together with the extension spring 44, chains 42, 42 form a Y-shaped spring biasing linkage. Fastened to each of arms 38 at the ends of arms 38 opposite their point of connection to horizontal bar 40 is one end of each of a pair of stablizer extension springs 46. The opposite ends of stablizer extension springs 46 are connected by means of eye bolts 48 to angle brackets 50 firmly secured to vertical support 26. Eye bolts 48 permit tension adjustments on springs 46 for purposes of leveling individual sprayer booms.

U-shaped connector 36 is rigidly attached to each of a pair of pivot arms 51 which extend obliquely upward from the plane defined by the bar and arms of spring connector 36. Spring connector 36 and pivot arms 51 are carried by vertical support 26 by means of mounting on upper pivot 34. Thus, pivot arms 51 and spring connector 36 function as a unit which swings about the pivot point defined by upper pivots 34. Pivotally connected to each of pivot arms 51 at their upper ends are individual pivot links 52.

Fastened opposite the end of pivot links 52 connected to pivot arms 50 is an upper journal 54. Upper journal 54 carries one end of a shaft 56 mounted for rotation between upper journal 54 and a lower journal 58. Upper journal 54 and lower journal 58 are each pivotally mounted. Lower journal 58 is pivotally mounted with respect to vertical support 26 from an extension ear 60 fixed to vertical support 26.

From the description to this point, it will be apparent that the structure surrounding shaft 56 and comprising shoulder section 18 permits shaft 56 to pivot angularly with respect to a lower pivot point 62 under the influence of forces from spring 44, springs 46, and the associated boom structure. Pivot 62 and upper pivot 34, since they are carried by vertical support 26, are rigid with respect to vertical support 26 and its associated vehicle 10. Shoulder section 18 contains two other pivot points, each of which is movable with respect to truck 10 and vertical support 26. These are the pivot points at opposite ends of pivot links 52, which will be denoted as pivots 64 and 66.

Shaft 56 carries its associated sprayer boom. Thus, the entire sprayer boom is rotatable about the axis of shaft 56 to the extent that rotation is not limited by the spring bias exerted by means of connection of the Y-shaped spring arrangement 42, 42, 44 to the individual boom.

The section of each individual boom between the shoulder section and the elbow portion comprises an upper inner arm 70, a lower inner arm 72, and a double acting shock absorber or damping member 74. Inner arms 70, 72 are each pivotally mounted to shaft 56 at pivot points 80 and 82 respectively. The opposite ends of inner arms 70, 72 are also pivotally attached. These ends of inner arms 70, 72 are attached at elbow portion 20 to a generally vertical brace 84. Pivotal attachment to vertical brace 84 is at pivot 86 and pivot 88. It is preferred that each of arms 70 and 72 be of equal lengths between its respective pivot points, and that the distance between pivots 80 and 82 carried by shaft 56 be equal to the distance between pivot 86 and 88 on vertical brace 84. This enables the linkage connecting shoulder section 18 and elbow portion 20 of the individual sprayer booms to function as a parallelogram-type linkage biased by double acting shock absorber member 74 and the spring forces previously identified.

FIG. 6 shows details of the elbow portions 20 of a particular embodiment of the present invention. As shown in FIG. 6, vertical brace 84 includes angle brackets 90 and 92 at opposite ends of the brace. Pivotally mounted to angle bracket 90 by any conventional means at a pivot connection 94 is an upper portion of an outer arm of the individual sprayer boom, the outer arm being generally designated 100. A lower portion of the outer arm is similarly connected by means of a pivot connection 102 to angle bracket 92. This permits the outer arms of the individual sprayer booms to rotate in a generally horizontal direction about the axis defined by pivot connections 94 and 102. An at-rest or normal position of outer arm 100 is maintained by means of a spring bias connection back to horizontal bar 40. This connection includes extension spring 44 and chains 42, 42 connected to opposite ends of horizontal bar 40.

As shown best in FIGS. 6 and 12, the end of spring 44 opposite that connected to chains 42, 42 is fastened by means of a chain 110 to a spring linkage bolt 112. Bolt 112 is displaced from pivot connection 102 and normally creates a moment about the axis defined by pivot connection 102 and pivot connection 94 to center outer arm 100 by bringing outer arm 100 into a position where a plate or portion of an angle 116 is essentially aligned with a plate on angle bracket 92 oriented generally transverse to the extent of the sprayer boom arms. In certain preferred embodiments angle bracket 92 and angle bracket 90 may carry cushion pads such as cushion pads 118 shown in FIG. 12. These cushion pads serve to permit breakaway and return of outer arms to a normal position without metal-to-metal contact between inner and outer arms.

For purposes of adjustment of the center position of the individual booms, and tension on a spring 44, a pair of turnbuckles 120, 120 are provided. Each turnbuckle is fastened between horizontal bar 40 and one end of an appropriate chain 42. (See FIG. 12.)

One of chains 42, 42 is provided with an extension mechanism to release tension from one side in order to permit a rotation of the individual spray boom about shaft 56 without creating undue tension on extension spring 44 as a result of spring bias. In the embodiment shown, this takes the form of an adjustable link mechanism generally designated 122.

Mechanism 122 includes a pivot bar 124 fastened at one end to extension spring 44 by means of a hook 126. The opposite end of pivot bar 124 contains a pivot connection to a release handle 128. Release handle 128 is shown in FIG. 12 in its normal unreleased position. In this position, the working end of handle 128 is captivated by means of a sheath 130 to hold mechanism 122 in an unreleased position. The end of release handle opposite that portion normally held by sheath 130 contains a pivot connection 132. Pivot connection 132 connects handle 128 to a hook 134, which is in turn connected to a link of chain 42. When sheath 130 is slid upward along chain 42 to free release handle 128, release handle 128 may swing outward to release an additional length of chain. This additional length is approximately equal to twice the distance between pivot 132 and the pivot on pivot bar 124. This release of tension in chain 42 permits the boom to swing about the axis of shaft 56 to a forward position for storage.

Central support structure 12 will now be described in some detail. This is best understood by reference to FIGS. 3, 4, 13, and 14. Central support structure 12 includes a tube member 24 previously identified into which individual booms are telescopically received. Tube member 24 is fixed by means of U-bolts or other suitable fasteners to a pair of channels 140, 140 through a pair of standards 141, 141. Channels 140, in the preferred embodiments, extend generally along the bed of truck 10. Standards 141, 141 are tilted forward slightly with respect to a normal to the bed of truck 10. Channels 140 may be right angle channels sufficiently spaced apart to receive the bottom portion of a sprayer tank 142. Sprayer tank 142 may be constructed of polyethylene or other suitable material.

As shown particularly in FIG. 13, each of channels 140 may carry a mechanism to secure central support structure 12 within the box of a pickup truck 10. In the embodiment shown, a securing rod 150 is telescopically received within a cylindrical sleeve 152. Securing rod 150 may be fastened at a particular position within cylindrical sleeve 152 by means of a set screw 154 as shown, clamping of the sleeve, or other suitable means. Securing rod 150 includes a primary generally cylindrical rod with a rod portion 156 extending transversly from it. For cushioning and for secure fastening within the pickup-truck bed, the ends of securing rod 150 and rod portion 156 are covered with a cushioning material identified as cushioning caps 158. In the particular embodiment shown, cylindrical sleeve 152 is in turn fastened to its associated channel 140 by means of a clamp structure comprising an angle piece 160, an ear 162 carrying a threaded appature and a clamping screw 164. Use of a clamping arrangement of this type permits movement of the securing structure along the channel to accommodate different size pickup beds.

FIG. 4 illustrates the portion of central support structure 12 proximate tank 142. Immediately forward or tank 142 and fastened to channels 140 by welding, bolts of other suitable means are a pair of vertical frame elements 170. Vertical frame elements 170 in turn support and are rigidly fastened to a tube member 172 which extends generally transversly of the direction of travel of truck 10 across the width of the bed of truck 10.

Each of a pair of forward vertical supports 174 is telescopically received within opposite ends of tube member 172. These vertical supports are generally right angular in shape. They may be secured within tube member 172 by a set screw as shown, or any other suitable fastener. The forward vertical support 174 provide a means of securing individual folded booms for storage and also provide support legs to store the apparatus when it is removed from the pickup truck or other drive vehicle. As is the case with vertical supports 26 at the rear of central support structure 12, each of forward vertical supports 174 has a foot with an extension leg telescopically received within the support. The feet and extension legs may be secured by any of a number of means. The means shown in FIG. 4 are a cotter pin held projection which extends through a hole in the wall of each of the hollow vertical supports 174.

As previously mentioned, forward vertical supports 174 may each be provided with a means for securing individual booms during storage. Upon operation of adjustable link mechanism 122, each of the booms may be swung forward and folded for storage. FIG. 14 is a sectional view which shows upper inner arm 70 in a storage position secured by one of the forward vertical supports 174. For this purpose, forward vertical supports may be provided with a pair of parallel horizontally extending ears 178, each of which has an aperture to receive a cotter pin 180 or other suitable fastener to secure a portion of an individual sprayer boom when it is folded forward against the outer surface of its associated forward vertical support 174.

While the sprayer apparatus of the present invention has been described principally in connection with its use on pickuptruck vehicles, the invention is equally adaptable to use with other drive vehicles and methods of transport. One such alternative transport arrangement is shown and illustrated in FIGS. 15 and 16. This is an arrangement for mounting the sprayer and its associated tank to a vehicle provided with a threepoint hitch mechanism. In FIG. 15, the equivalent of the female tube member 24 previously described is marked with reference numeral 24'. This is a tube member which would receive the extension bars to mount the individual booms of the sprayer apparatus. Also by analogy to previous figures, the extension bars shown fragmentarily in dotted line form have been marked 22' in the figure. In the specific embodiment shown in FIGS. 15 and 16, female tube member 24' carries a pair of lower hitch brackets 190 each of which is secured by means of a U-bolt connection extending about female tube member 24'. Positioned centrally of lower hitch brackets 190 is a central hitch bracket 192. Central hitch bracket 192 may be fastened to tube member 24' by welding or other suitable means.

As shown in FIGS. 15 and 16, a generally cylindrical reservoir tank 194 is strapped in a conventional manner to a tank support frame 196. Tank support frame 196 is in turn fastened to tube member 24' by welding or other suitable means. It is also supported in part by a central bracket 192 in the embodiment shown. This support is provided by means of a welded angle brace 200 shown best in FIG. 16. As will be apparent to persons of skill in the art, a three-point hitch mounting of this type is a readily suitable alternative for use in connection with the individual boom structure previously described for use on a pickup-truck bed.

OPERATION

FIGS. 1 and 2 best illustrate normal operation of the individual boom structures to provide the primary advantages of the present invention. FIG. 1 illustrates a boom condition when the truck 10 moves essentially in a vertical direction. FIG. 2 illustrates movements when the truck is tilted over uneven ground surface. Finally, FIG. 3 illustrates breakaway features of the individual booms.

Assuming that the truck 10 has just encountered a sudden bump which forces the entire truck in the generally upward direction, the inertia of the boom structure causes the boom to tend to move downward with respect to truck 10. This results in an additional force on spring 44. The additional force on spring 44 tends to act on U-shaped spring connector 36 to cause the connector to pivot outward with respect to the vehicle 10 about upper pivot 34. This movement is transmitted through pivot links 52 so that it shifts the upper portion of shaft 56 inward or toward truck 10. Because the portion of the individual boom between shoulder section 18 and elbow portion 20 is essentially a spring-biased parallelogram structure, this movement also tilts vertical brace 84, which causes a lifting motion of outer arms 100. Therefore, the downward movement of vertical brace 84 caused by extension of spring 44 in response to inertial effects is partially compensated for by tilting caused by shoulder section 18 of the boom. This is illustrated by arrows in FIG. 1 which show the downward movement of vertical brace 84 and relative upward movement of the outer arms of the booms. In normal operation with no unevenness, shaft 56 and vertical brace 84 for each boom should be essentially vertical. The shifted positions in response to movement of the truck generally vertically over a bump or a hillock is illustrated in FIGS. 5 and 6.

FIG. 2 illustrates the movement of individual booms in response to a lateral unevenness which causes truck 10 to tilt. In FIG. 2, right sprayer boom 16 responds to the movement in much the same manner as is illustrated and discussed for both booms in FIG. 1. However, left sprayer boom 14 sees what is essentially downward angular shifting of the support. This results in a tendency of the force on extension spring 44 to ease up and lessen. This is much like the "unweighting" affect familiar to those involved in recreational skiing. The release of force from extension spring 44 allows the associated U-shaped spring connector 36 for shoulder section 18 of left sprayer boom 14 to pivot about pivot 34 in a direction toward truck 10. This tends to swing the associated shoulder section 18 generally outward with respect to truck 10. Such movement tilts the upper end of shaft 56 away from truck 10 and results in a corresponding shift in the angular position of associated vertical brace 84. (See FIGS. 7 and 8). This tilting effect causes a downward movement of the outer arm of the boom which partially compensates for the relative upward movement of brace 84 in response to inertial effects.

Each of the booms also has a breakaway feature to protect it against obstructions, ground contact, and to allow vehicle 10 to turn in a shorter radius at the end of a field or in close quarters. As previously discussed, the inner arms of the boom between the shoulder sections 18 and elbow portions 20 are rotatable about shaft 56. This permits the boom to "give" in response to contact with obstructions. Because of the Y-shaped spring bias linkage carried by chains 42 and extension spring 44, the inner arms of the individual are biased to a center position transverse to the direction of movement of truck 10. Contact with an obstruction will cause extension of spring 44 and a movement of the inner arms of the individual boom angularly about shaft 56. Once the obstruction is overcome or removed, extension spring 44 provides a centering force for the boom.

In addition to providing this advantage, because the extension spring linkage is fastened to outer arms 100 at a positon which creates a moment tending to position the outer arm transverse to vehicle movement, the extension spring also provides a breakaway feature which affects the outer arm assembly. Furthermore, because of the operation of shoulder section 18 in combination with the spring linkage, extension of spring 44 during breakaway will tend to cause an upward movement of the upper portion of the individual boom. (See FIG. 1) This will tend to relieve any obstruction caused by ground contact or a low object struck in a field.

Storage of the sprayer appartus of the present invention is facilitated by release of adjustable link mechanism 122 which permits a forward swinging action of the inner arms of the individual boom so that the inner arms may be secured against forward vertical supports 174. This securing technique was previously discussed in connection with FIG. 14. In addition, outer arms 100 can be swung in an opposite direction, thereby folding the sprayer booms compactly against the sides of vehicle 10.

While this portion of the application has discussed details of construction and operation of the invention for purposes of illustration and understanding, it will be understood that many modifications may be made by those of ordinary skill in the art without departing from the spirit and scope of the present invention. Such modifications might include different means of mounting, different vehicles for transport, differences in fastening construction of individual elements, and differences in the materials and specific pieces used to accomplish the functions of the various elements of the invention.

What is claimed is:

1. Boom apparatus for agricultural applications, comprising:
   (a) a cantilevered boom structure suitable for mounting of sprayer heads;
   (b) means mounting said boom structure to a drive vehicle, said mounting means permitting rotation of said boom about a generally vertical axis to permit said boom to yield in response to obstruction contact; and
   (c) spring-biased centering means, connected to said boom structure to maintain said boom structure oriented generally transverse to said drive vehicle in normal position, and to recenter said boom structure to said transverse position absent obstructive forces thereon, said centering means comprising a Y-shaped spring linkage including a base portion interconnected to two diverging top portions, said Y-shaped spring linkage connected at two points at the top portions to said mounting means and at one point along the base portion to said boom structure, said spring-biased centering means including means which lift the outboard end of said boom structure as said boom structure moves away from its normal position to allow said structure to overcome obstacles or lift from ground contact, said boom structure including a parallelogram linkage normally biased into a substantially rectangular position by said centering means.

2. The structure of claim 1 wherein said parallelogram linkage constitutes a first portion of said boom structure, and a second outboard portion of said boom structure is hingedly attached to said first portion proximate one side of said parallelogram.

3. The structure of claim 2 wherein said first portion is rotatably attached to said mounting means and said centering means biases both portions to a center position which is generally transverse to said drive vehicle.

4. The structure of claim 1 wherein said parallelogram linkage includes a damping member acting across two adjacent sides of the parallelogram.

5. The structure of claim 1 and means permitting release of tension on one side of said Y-shaped spring linkage to allow folding of said boom against the side of a drive vehicle.

6. A suspension system suitable for use in maintaining a sprayer boom at a reasonably constant height over a ground surface, comprising:
   (a) an outer boom arm adapted to receive and mount sprayer heads;
   (b) an inner boom arm including a parallelogram linkage connected along a first side thereof to said outer boom arm, said linkage being in a plane generally parallel to said sprayer boom;
   (c) means for mounting said linkage to a drive vehicle along a second side of said linkage opposite said first side; and
   (d) means spring-biasing said linkage to provide support to hold said outer boom arm above a ground surface when said system is mounted to a vehicle.

7. The apparatus of claim 6 further including a damping member connected between two adjacent sides of said parallelogram linkage.

8. The apparatus of claim 6, and a second linkage positioned between said parallelogram second side and said mounting means, said second linkage being spring-biased to cause said second side to shift in a direction which compensates for movements of said vehicle when said apparatus is mounted thereto.

9. The apparatus of claim 8, wherein a damping member is connected between two adjacent sides of said parallelogram linkage.

10. The apparatus of claim 8, wherein said parallelogram second side is hinged to allow outboard portions of said boom to break away from a normal position upon impact.

11. The apparatus of claim 10, wherein said outer boom is hingedly connected to said parallelogram linkage to allow double articulation of said suspension system.

12. The apparatus of claim 11, and bias means tending to position said outer boom arm and said parallelogram linkage generally transverse to the direction of travel of a vehicle to which such structure is adapted to be mounted.

13. Boom apparatus for agricultural applications, comprising:
  (a) a cantilevered boom structure suitable for mounting of sprayer heads, said boom structure including an inboard end portion and an outboard end portion, said outboard end portion being articulately interconnected to said inboard end portion for movement in a generally vertical plane with respect to said inboard end portion;
  (b) means for mounting said boom structure to a drive vehicle, said mounting means permitting rotation of said boom about a generally vertical axis to permit said boom to yield in response to obstruction contact;
  (c) spring-biased centering means, connected to said boom structure to maintain said boom structure oriented generally transverse to said drive vehicle in its normal position, and to recenter said boom structure to said transverse position absent obstructive forces thereon; and
  (d) said spring-biased centering means also including means for lifting said outboard end portion of said boom structure independently of said inboard end portion as said boom structure moves away from its normal position to allow said structure to overcome obstacles or lift from ground contact.

14. A boom apparatus in accordance with claim 13, wherein said boom apparatus further includes means connected to said boom structure for articulated movement of said outboard end portion in response to vertical movement of said inboard end portion, said outboard end portion being moved in a generally vertical direction opposite that of the direction of movement of said inboard end portion whereby said outboard end portion is maintained at a reasonably constant height over a ground surface.

* * * * *

UNITED STATES PATENT AND TRADEMARK OFFICE
CERTIFICATE OF CORRECTION

PATENT NO. : 4,441,655

DATED : April 10, 1984

INVENTOR(S) : Harold Blumhardt

It is certified that error appears in the above-identified patent and that said Letters Patent is hereby corrected as shown below:

Column 1, line 11, after "of" insert --the--.

Column 1, line 57, "uneveness" should be --unevenness--.

Column 1, line 64, "pickuptruck" should be --pickup truck--.

Column 2, line 10, "y-shaped" should be --Y-shaped--.

Column 2, line 24, "occured" should be --occurred--.

Column 2, lines 27 and 29-30, "pickuptruck" should be --pickup truck--.

Column 2, line 38, "accompaning" should be --accompanying--.

Column 6, line 53, "embodiments" should be --embodiment--.

Column 7, line 1, "transversly" should be --transversely--.

Column 7, line 9, "appature" should be --aperture--.

Column 7, line 14, "or" should be --of--.

Column 7, line 19, "transversly" should be --transversely--.

UNITED STATES PATENT AND TRADEMARK OFFICE
CERTIFICATE OF CORRECTION

PATENT NO. : 4,441,655

DATED : April 10, 1984

INVENTOR(S) : Harold Blumhardt

It is certified that error appears in the above-identified patent and that said Letters Patent is hereby corrected as shown below:

Column 7, line 54, "pickuptruck" should be --pickup truck--.

Column 9, line 18, "carried" should be --created--.

Column 9, line 38, "appartus" should be --apparatus--.

Column 12, line 9, delete "independently of" and insert therefor --in a generally vertical plane with respect to--.

Signed and Sealed this

Sixth Day of November 1984

[SEAL]

*Attest:*

*Attesting Officer*

GERALD J. MOSSINGHOFF

*Commissioner of Patents and Trademarks*